United States Patent [19]

Gudat

[11] 4,056,287
[45] Nov. 1, 1977

[54] CIRCUIT ARRANGEMENT FOR PRODUCING A DIGITAL SPEED SIGNAL CORRESPONDING TO THE ANGULAR VELOCITY OF A WHEEL FROM THE HALF CYCLE DURATION OF THE SINUSOIDAL WAVEFORM GENERATED BY THE WHEEL

[75] Inventor: Wolfgang Gudat, Hannover, Germany

[73] Assignee: WABCO Westinghouse GmbH, Hannover, Germany

[21] Appl. No.: 748,745

[22] Filed: Dec. 9, 1976

[30] Foreign Application Priority Data

Jan. 20, 1976 Germany .............................. 2601800

[51] Int. Cl.² .............................................. B60T 8/02
[52] U.S. Cl. ................................. 303/91; 180/105 E;
364/426; 364/565; 303/95; 324/160; 324/166; 340/263; 361/238; 361/239
[58] Field of Search ................. 180/105 E; 235/150.2, 235/151.32; 303/91, 96, 109, 20, 95; 324/160-161, 166; 340/53, 62, 263; 361/236, 238, 239, 242

[56] References Cited

U.S. PATENT DOCUMENTS

| 3,744,854 | 7/1973 | Ooya et al. ...................... 303/95 X |
| 3,757,167 | 9/1973 | Yoshikawa et al. .............. 303/95 X |
| 3,885,137 | 5/1975 | Ooya et al. ..................... 235/150.2 |

OTHER PUBLICATIONS

Bederman, S., Computer and Apparatus for Measuring Rotational Speed, IBM Technical Disclosure Bulletin, vol. 13, No. 4, Sept. 1970.

*Primary Examiner*—Stephen G. Kunin
*Attorney, Agent, or Firm*—R. W. McIntire, Jr.

[57] ABSTRACT

In a circuit for producing a digital wheel speed signal from the duration of a half cycle alternation of the sinusoidal waveform produced by a wheel sensor, there is provided a control unit which operates a first counter until it reaches a count corresponding to the duration of the half cycle alternation of the sinusoidal waveform and in response to this occurrence effects operation of a second counter until the first counter reaches a predetermined final stage. A signal representing the duration of a half cycle alternation, which is inversely proportional to the angular wheel velocity is thus converted by the control unit so as to produce a wheel speed signal that is directly proportional to the angular wheel velocity. According to the present invention, the pulse frequency supplied to at least one of the first and second counters is adjusted according to the stage of the counter so as to change exponentially and thereby provide for faster generation of the wheel speed signal.

5 Claims, 2 Drawing Figures

CIRCUIT ARRANGEMENT FOR PRODUCING A DIGITAL SPEED SIGNAL CORRESPONDING TO THE ANGULAR VELOCITY OF A WHEEL FROM THE HALF CYCLE DURATION OF THE SINUSOIDAL WAVEFORM GENERATED BY THE WHEEL

BACKGROUND OF THE INVENTION

The present invention relates to an anti-skid brake control system for a wheeled vehicle and particularly to an arrangement wherein a wheel sensor generated alternating voltage that varies in frequency with the angular velocity of the wheel is utilized to obtain a digital wheel speed signal.

A digital wheel speed signal can be obtained directly from the wheel generated alternating voltage by shaping the waveform and feeding the resulting pulsed output to a binary counter during a predetermined constant time interval. A disadvantage of this method of forming the digital wheel speed signal is the inability to provide the degree of anit-skid control sensitivity desired, particularly at low wheel speeds, due to the constant time interval during which the wheel speed pulses are counted. The speed signals of successive time intervals are compared to detect a change of wheel speed for the purpose of detecting an impending wheel skid condition. Obviously, at low speeds only a relatively few pulses occur during the time interval, whereas at high speeds numerous pulses occur. Consequently, a slight change in speed at high wheel velocities may be detected by a difference of perhaps only a few pulses, while at low wheel speeds this same change in speed will be insufficient to produce a different pulse count and is accordingly undetectable.

This disadvantage of a constant time interval, as mentioned above, can be overcome by providing a time period that varies according to the wheel velocity, during which time period pulses generated at a constant frequency are counted. The wheel speed dependent time period, in an arrangement of this type, is typically formed from a half cycle of the wheel generated alternating voltage waveform. The main disadvantage of such an arrangement, however, is that the impulses counted vary inversely with wheel velocity, thus requiring additional circuitry to reverse the relationship between the pulse count and wheel velocity to obtain a suitable wheel speed signal.

One method of reversing this inverse relationship is to perform an arithmetic operation in which the digital wheel speed signal is subtracted from a constant. Inasmuch as this operation is performed within the duration of a half cycle of the wheel generated alternating voltage waveform, which varies with wheel speed, it will be appreciated that the speed at which the arithmetic operation takes place is critical.

SUMMARY OF THE INVENTION

The object of the present invention, therefore, is to more quickly obtain a digital wheel speed signal that is directly proportional to the angular velocity of the vehicle wheel.

This objective is accomplished by simulating the logarithm of a half cycle duration of the wheel generated alternating voltage waveform, subtracting this logarithmic value from the logarithm of a constant, and subsequent delogarithmation.

The binary coded output of a first counter corresponding to the duration of an initial half cycle of the wheel generated alternating voltage waveform is stored at a first input of a digital comparator during the successive half cycle. During this latter half cycle, a constant frequency pulse generator device is activated. The pulse generator output is connected to a second counter via a first divider circuit that varies the frequency of the pulses supplied to the counter as a function of the stage of the counter so as to follow the slope of a desired exponential function, e.g. $V = 10^x$.

The output of this second counter is connected to a second input of the comparator whose output activates a third pulse generator when the binary code signals at the first and second inputs of the comparator correspond. This third pulse generator provides a constant frequency train of pulses to a third counter via a second divider circuit that varies the frequency of pulses supplied to the counter as a function of the stage of the counter so as to also follow the slope of a desired exponential function.

A recognition circuit senses the final stage of the second counter in order to terminate the first and second pulse generators when the second counter has reached a predetermined constant value. The count registered by the third counter when the second counter has advanced to its final stage thus provides a binary code signal representative of the speed of the vehicle wheel being monitored.

In that the second and third counters operate exponentially, it will be seen that faster generation of the speed signal is obtained.

DESCRIPTION AND OPERATION

Figure 1:
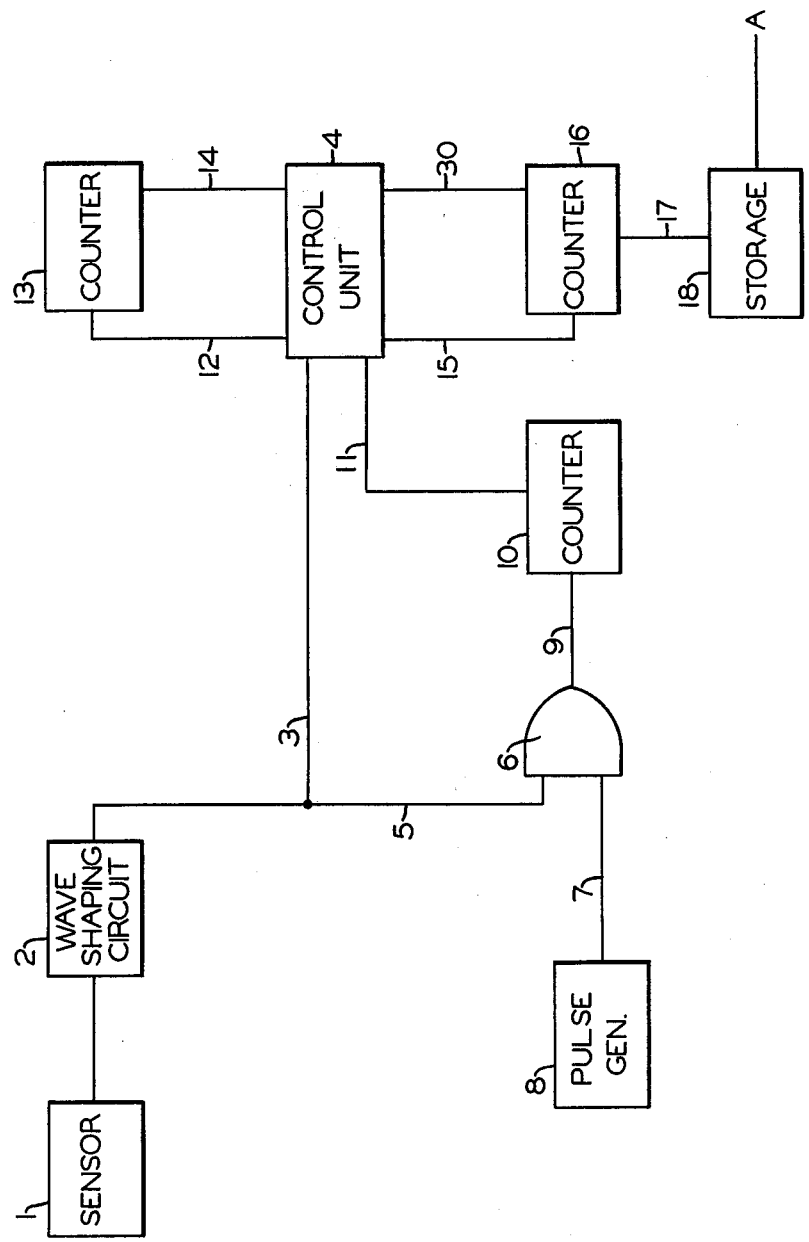
FIG. 1 of the drawings shows a block diagrammatic of a circuit arrangement for providing a digital wheel speed signal according to the invention.

Referring initially to FIG. 1, there is shown a sensor device represented by block 1, which functions to generate a sinusoidal waveform having a frequency that varies in direct proportion to the angular velocity of a wheel (not shown) with which the sensor device is associated. The sensor device of block 1 is conventional, consisting generally of a toothed rotor fixed to the wheel hub for rotation therewith and a stator member fixed relative to the rotor to permit the rotor teeth to pass in proximity therewith as the wheel turns. Variations in the magnetic flux field of the stator as the teeth of the rotor pass the stator produces the sinusoidal waveform. This waveform is converted to a square wave by a conventional wave shaping circuit represented by block 2, whose output is connected via line 3 to a control unit 4. A branch line 5 of line 3 connects the output of block 2 with a first input of an AND gate circuit 6. A second input of AND gate circuit 6 is connected via a line 7 with a pulse generator 8 having a constant frequency output whose frequency may be adjusted as desired. The output of AND gate circuit 6 is connected via a line 9 with a binary counter 10. For the duration of each pulse of the square wave shaping circuit of block 2, which varies with the angular velocity of the wheel with which sensor device 1 is associated, AND gate circuit 6 is enabled to transmit the higher frequency pulses of pulse generator 8 to counter 10. The binary coded output of counter 10 representing the number of pulses for the duration of a half cycle of the sinusoidal waveform generated by sensor device 1 is connected with control unit 4 via line 11, but is inversely proportional to the angular velocity of the wheel.

Also connected with control unit 4 via a line 12 is a counter 13 whose binary coded output is connected back to control unit 4 via a feedback line 14. Still another counter 16 is connected to control unit 4 via line 15. An output 17 of counter 16 connects the binary coded output, representing the stage of counter advancement, to a storage unit 18. The output signal from storage unit 18 is connected to the wheel anti-skid brake control system via line A to influence the wheel brake pressure.

Basically, control unit 4 operates during a half cycle alternation of the sinusoidal waveform following the initial half cycle alternation during which the pulses of pulse generator 8 are counted by counter 10. During operation control unit 4 supplies pulses to counter 13 via line 12. When the stage of counter 13 corresponds to the stage of counter 10, control unit 4 begins to supply pulses to counter 16, but terminates this supply of pulses to counter 16 whenever counter 13 has reached its final predetermined stage. In this sense, it will be seen that the stage of advancement of counter 16 corresponds to the difference between the stage to which counter 10 had advanced during the initial half cycle alternation of the sinusoidal waveform and the predetermined final stage of advancement of counter 13. This difference value is thus directly proportional to the momentary angular velocity of the wheel being monitored.

Figure 2:
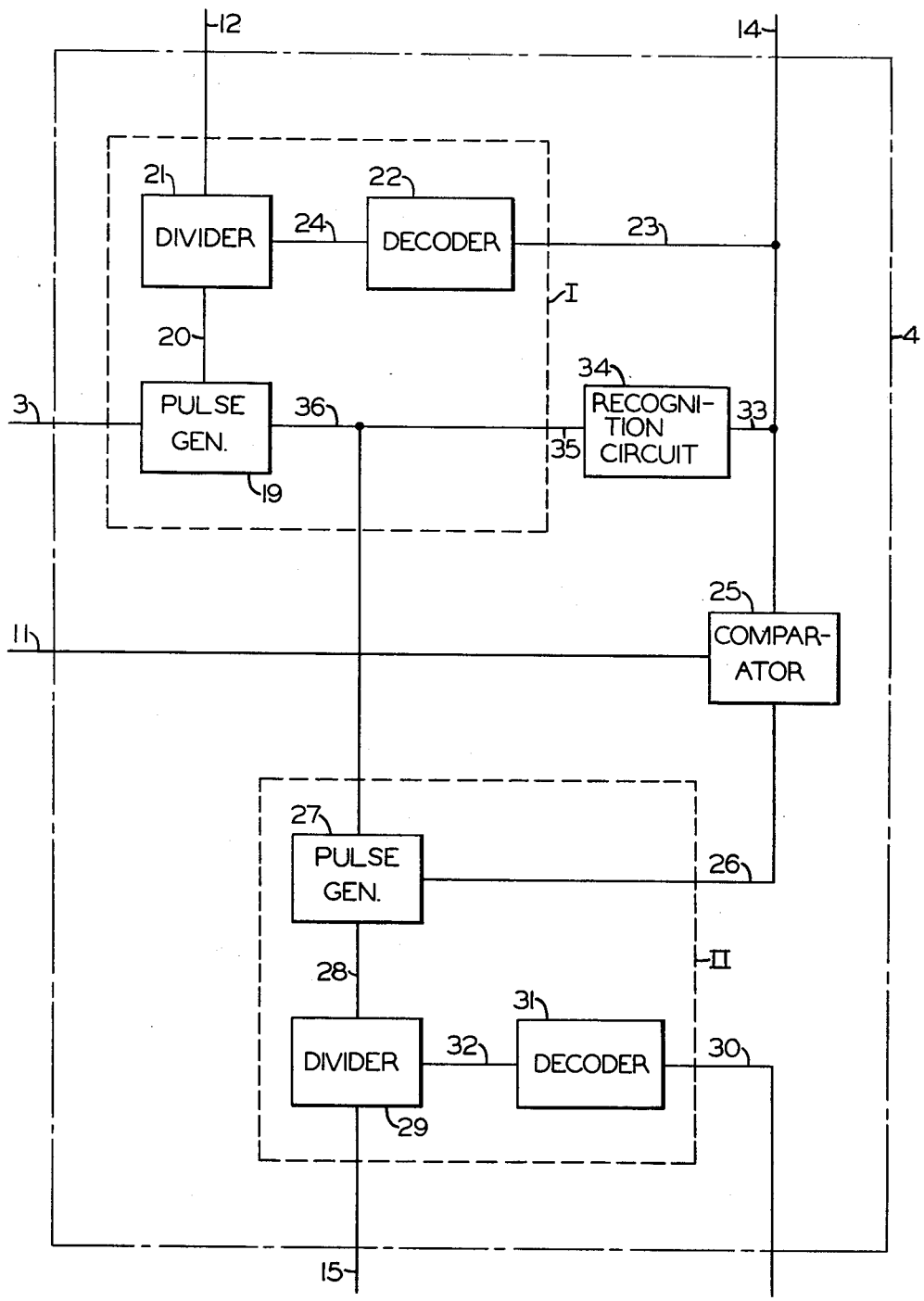
FIG. 2 of the drawings is a further block diagrammatic of a control unit employed in the FIG. 1 arrangement.

Control unit 4 is shown in greater detail in FIG. 2. A pulse generator 19 receives the pulsed output from wave shaping circuit 2 via line 3. During the time of a pulse, pulse generator 19 is deactivated, and is activated in response to termination of the pulse until the next pulse arrives. For the duration of the interval between pulses, a line 20 transmits the pulses from pulse generator 19 to binary counter 13 via a divider circuit 21 and line 12. The binary coded output of counter 13 is fed to a decoder circuit 22 via feedback line 14 and a branch line 23. In that lines 14 and 23 carry a binary code signal, these lines actually represent a multi-line output. A line 24 connects the output of decoder 22 to a control input of divider circuit 21. Pulse generator 19, divider 21 and decoder 22 comprise a frequency control unit I, which varies the frequency of pulses emitted by pulse generator 19 during the computing time between pulses from square wave shaping circuit 2. Decoding unit 22 monitors the binary code output signal of counter 13 to detect the stage of the counter, so a to influence divider 21 in such a manner that the frequency of pulses supplied to the counter via line 12 is increased in accordance with a predetermined exponential function.

Lines 11 and 14 are each connected to a digital comparator 25, whose output is connected via a line 26 to a pulse generator 27. Only when the binary coded outputs of counters 10 and 13 correspond (which occurs more rapidly due to the exponential counter operation) does the comparator emit an output signal to activate pulse generator 27. A line 28 connects the output of pulse generator 27 to a divider circuit 29. The pulses produced by pulse generator 27 are fed to counter 16 via divider 29 and line 15. A feedback line 30 connects the counter output with the input of a decoding unit 31. In that feedback line 30 carries the binary coded output of counter 16, this line actually represents a multi-line output. A line 32 connects the output of decoder 31 to a control input of divider circuit 29. Pulse generator 27, divider 29 and decoder 31 comprise a frequency control unit II, which decreases the frequency of pulses emitted by pulse generator 27 in accordance with a predetermined exponential function. The stage of counter 16 thus changes exponentially, but with opposite timing as counter 13. That is, the pulses fed to counter 13 progressively increase in frequency, while the pulses fed to counter 16 progressively decrease in frequency.

A branch line 33 of feedback line 14 is connected to a recognition circuit 34 which monitors counter 13 to detect a predetermined final stage of advancement. A line 35 and a branch line 36 connect the output of recognition circuit 34 to a second input of the respective pulse generators 27 and 19.

A control impulse emitted by recognition circuit 34 when counter 13 has reached its final stage of advancement terminates operation of pulse generators 19 and 27. This ends any further operation of counter 16, whose digital output signal in the form of a binary code is directly proportional to the vehicle wheel speed.

By progressively increasing the rate of pulses fed to counter 13 via frequency control unit I, it will be appreciated that the digital wheel speed signal is realized faster than heretofore possible. Also, by similarly varying the pulse frequency to counter 16 via frequency control unit II, but with opposite timing as the frequency variation to counter 13, counter 16 is assured of counting the same number of pulses during its period of operation as counter 13 does during the period between the time the signal from counter 13 matches the signal from counter 10 until the final stage of counter 13 is reached. It will be appreciated therefore that the present invention not only provides for faster generation of a speed signal by progressively increasing the frequency of pulses fed to counter 13, but concurrently retains the ability to provide the wheel speed signal in direct proportion to the wheel velocity by progressively decreasing the frequency of pulses fed to counter 16.

Having now described the invention, what I claim as new and desire to secure by Letters Patent, is:

1. A circuit for providing a digital wheel speed signal comprising:
   a. wheel sensor means for generating a sinusoidal waveform having a frequency directly proportional to the angular velocity of a vehicle wheel;
   b. a gating circuit connected with said wheel sensor means so as to be enabled during a first half cycle duration of said sinusoidal waveform;
   c. first pulse generator means for emitting pulses at a constant frequency;
   d. a first multi-stage digital counter to which said impulses are connected via said gating circuit only so long as said gating circuit is enabled, said first counter providing an output signal that varies inversely with the angular wheel velocity; and
   e. control means for modifying the output signal of said first counter so as to vary in direct proportion to the angular wheel velocity comprising:
      i. a second multi-stage digital counter;
      ii. first means for supplying impulses to said second counter at a frequency that changes exponentially;
      iii. a third multi-stage digital counter;

iv. second means for supplying impulses to said third counter at a frequency that changes exponentially;

v. comparator means for activating said second means only when the output signals of said first and second counters are equal; and vi. means for recognizing the final stage of said second counter to deactivate said second means, whereby the output of said third counter corresponds to the difference between the final stage output of said second counter and the output of said first counter following expiration of said first half cycle duration of said sinusoidal waveform.

2. A circuit, as recited in claim 1, wherein said first and second means each comprise:

a. a pulse generator for emitting said impulses to a respective one of said second and third counters;

b. a divider circuit between said pulse generator and the respective one of said second and third counters for effecting said change of frequency of said impulses; and c. a decoder connected between said divider circuit and the respective one of said second and third counters for detecting the specific stage thereof and accordingly controlling said divider circuit so as to effect said change of the impulse frequency.

3. A circuit, as recited in claim 2, further characterized in that said divider circuit of said first means effects said change of the impulse frequency supplied to said second counter in a progressively increasing manner.

4. A circuit, as recited in claim 3, further characterized in that said divider circuit of said second means effects said change of the impulse frequency supplied to said third counter in a progressively decreasing manner.

5. A circuit, as recited in claim 2, further comprising a wave shaping circuit connected to said wheel sensor means to convert said sinusoidal waveform into a square shaped pulse waveform, said pulse generator of said first means being activated responsive to expiration of a positive alternation of said pulse waveform.

* * * * *